March 11, 1930.  N. R. BROWNYER  1,749,901
EXPANDING BRAKE
Filed Dec. 5, 1927
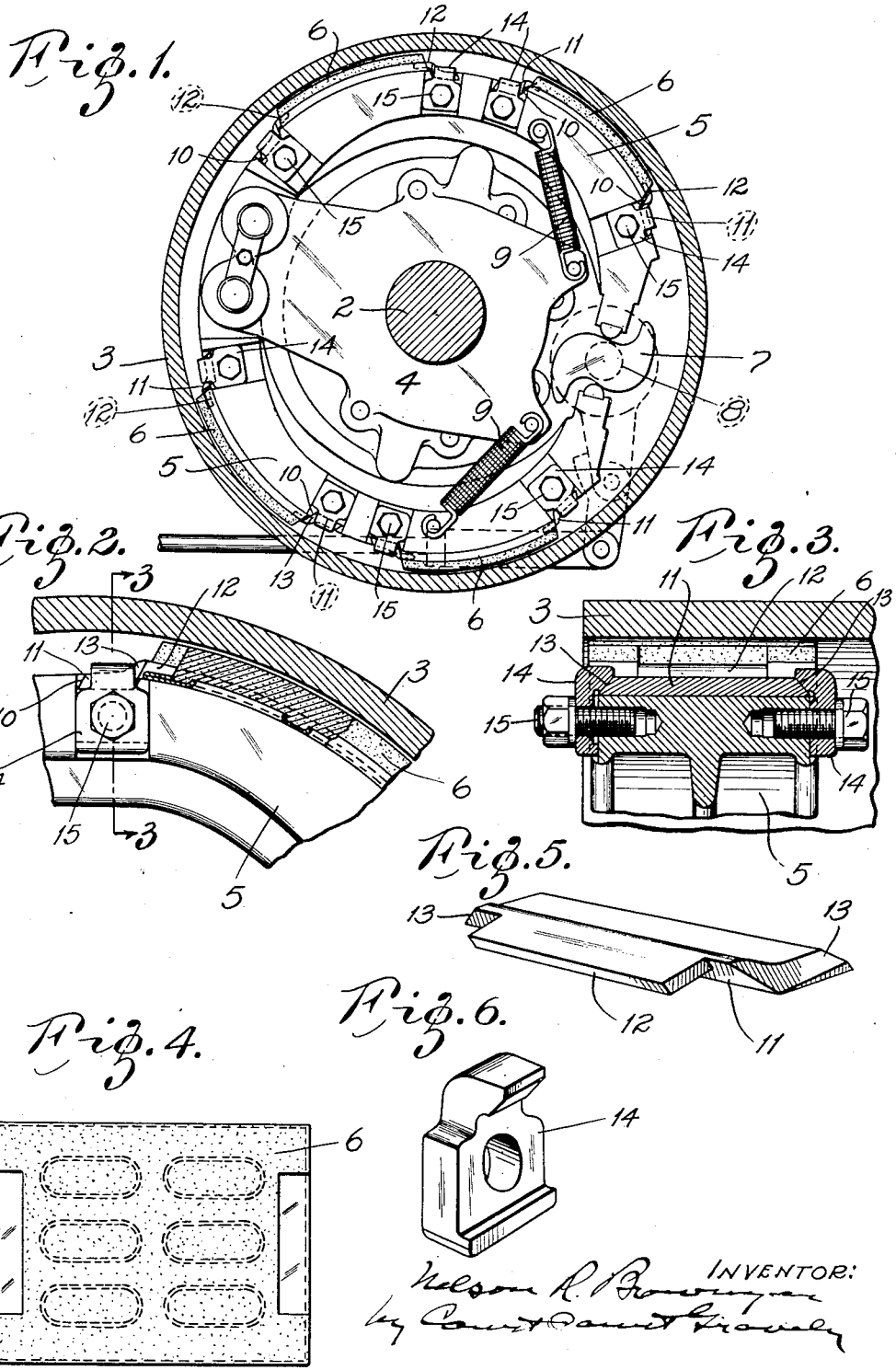
INVENTOR:
Nelson R. Brownyer
by Bond, Bond & Crowley
HIS ATTORNEYS.

Patented Mar. 11, 1930

1,749,901

UNITED STATES PATENT OFFICE

NELSON R. BROWNYER, OF DETROIT, MICHIGAN, ASSIGNOR TO THE TIMKEN-DETROIT AXLE COMPANY, OF DETROIT, MICHIGAN, A CORPORATION OF OHIO

EXPANDING BRAKE

Application filed December 5, 1927. Serial No. 237,721.

My invention relates to expanding brakes and particularly to that type of expanding brake wherein brake blocks are mounted upon pivoted brake shoes for cooperation with the inner surface of a brake drum. Heretofore the manner in which such brake blocks were mounted on the brake shoes made it necessary that the road wheel that carried the brake drum should be removed from its axle whenever it was desired to remove or replace a brake block; and it is the principal object of the present invention to provide for the removal and replacement of such brake block on a brake shoe without disturbing the road wheel or the brake drum thereon. The invention consists in the parts and combinations of parts hereinafter described and claimed.

In the accompanying drawing, wherein like reference numerals refer to like parts wherever they occur, Fig. 1 is a sectional view of the driving axle and brake drum of a vehicle, an elevation of a brake assembly embodying my invention being shown in connection therewith.

Fig. 2 is an enlarged fragmentary cross-section similar to Fig. 1, showing a portion of a brake shoe and one of the brake blocks in the region of one of the clamping lugs, Fig. 3 is a cross-section on the line 3—3 in Fig. 2, Fig. 4 is an exterior face view of one of the brake blocks, Fig. 5 is a perspective view of a locking cleat; and Fig. 6 is a perspective view of a clamping lug.

The construction illustrated in the accompanying drawing comprises a brake drum 3 of an ordinary road wheel (not shown) suitably mounted on a driving axle 2. Fixed to the stationary axle housing (not shown) is a spider or brake support 4 upon which two brake shoes 5 provided with brake blocks 6 are pivotally mounted. In accordance with common practice, a cam 7 is mounted between the free ends of said brake shoes which are adapted for cooperation therewith, the cam being mounted upon a rotatable shaft 8 that is provided with actuating means of any suitable type. The ends of said brake shoes are connected by a tension spring 9 that tends to pull the brake blocks clear of contact with the brake drum, when the brakes are released.

According to the present invention, the outer periphery of the brake shoes is provided with transverse notches 10 whose walls are substantially parallel and slope inwardly from the periphery in the opposite directions to that of the rotation of the wheel. There is one such transverse slot adjacent to each end of a brake block, the end portions of the brake block being made of less thickness than the convexly curved portion that is intended for contact with the inner surface of the brake drum. The brake blocks are secured by means of transverse cleats 11 that fit in the transverse notches and have angular extensions or fingers 12 that extend circumferentially and overlap the reduced end portions of said brake block.

Each of these cleats has beveled or sloping ends 13 and is arranged with its shorter face outermost and with the ends of its longer face substantially flush with the sides of the brake shoe. At each end of the cleat is a clamping lug 14 with a surface of substantially the same slope or inclination as that of the end of the cleat with which it contacts. Such lug is disposed radially and has its inner ends secured to the brake shoe by screws 15, bolts or the like located inwardly of the cleat, that is, located closer to the axle than the cleat is.

When the parts are assembled in a vehicle, the screws or fasteners on the wheel side of the brake shoe, being the side adjacent to the closed end of the brake drum are inaccessible, but it is not necessary to reach them to mount or replace a brake block. On the other hand, the fasteners on the other side of the brake shoe, being the side whose general plane is adjacent to the open end of the brake drum and hereinafter referred to as the open side, are readily accessible and removable while the parts are assembled. Each of the clamping lugs on the open side is preferably formed with a heel or lateral extension at its inner end and on the same side with its sloping surface, the bolt hole of said clamping device being located between said heel and said sloping surface. By this arrangement, the tightening of the screw or bolt causes pressure of the outer end of the clamping lug against the end of the cleat and insures not only proper clamping of the lug on the open side but also the proper engagement of the opposite or inaccessible end of the cleat with its clamping lug.

By the arrangement above described it is an easy matter to remove and replace a brake block without disturbing any other portion of the assembly except only the devices that hold said block. For such purpose, it is only necessary to loosen the screws or other devices that hold the clamping lugs on the open side of the brake shoe and then slide the cleats longitudinally outward in their notches far enough to cause the beveled inner ends of said cleats to clear the overhanging portions of the inner clamping lugs, whereupon the cleats are disengaged from the brake block, thereby permitting the block to be slid outwardly off the shoe.

What I claim is:

1. In an expanding brake, a pivoted brake shoe having transverse shoulders, a brake block, transverse cleats resting against said shoulders having portions that overlap the end portions of said block, lugs secured to said shoe inwardly of said block and having portions that overlap the ends of said cleats.

2. In an expanding brake, a pivoted brake shoe having transverse notches in its periphery, a brake block, transverse cleats in said notches having portions that overlap the end portions of said block, and lugs secured to said shoe inwardly of said block and having portions that overlap the ends of said cleats.

3. In an expanding brake, a pivoted brake shoe having transverse shoulders, a brake block, transverse cleats resting against said shoulders and constituting end abutments for said block and having portions that overlap the end portions of said block for holding said block against radial movement, and lugs secured to said shoe inwardly of said block and having portions that overlap the ends of said cleats.

4. In an expanding brake, a brake drum, a pivoted brake shoe having shoulders, a brake block and means for removably securing said block to said shoe, said means comprising transverse cleats resting against said shoulders and constituting abutments for preventing circumferential movement of said block and fastening devices for holding said cleats, said fastening devices being on that side of the brake shoe whose general plane lies adjacent to the open end of said brake drum whereby said fastening devices are accessible without dismounting the wheel.

5. In an expanding brake, a pivoted brake shoe having shoulders, a brake block, and means for removably securing said block to said shoe, said means comprising transverse cleats resting against said shoulders and constituting abutments for preventing circumferential movement of said block and clamping lugs mounted on the open side of the brake shoe for holding said cleats, said cleats having outwardly diverging ends and said clamping lugs having sloping surfaces adapted to cooperate with said ends.

6. In an expanding brake, a pivoted brake shoe having shoulders, a brake block and means for removably securing said block to said shoe, said means comprising transverse cleats resting against said shoulders and constituting abutments for preventing circumferential movement of said block and clamping lugs mounted on the sides of the brake shoe for holding said cleats, said cleats having outwardly diverging ends and said clamping lugs having sloping surfaces adapted to cooperate with said ends and the cleats on the open side having heels at their inner ends, and screws or the like securing said lugs to said brake shoe between said sloping portion and said heel.

Signed at Detroit, Michigan, this 1st day of December, 1927.

NELSON R. BROWNYER.